United States Patent [19]

Laib

[11] Patent Number: 4,580,553

[45] Date of Patent: Apr. 8, 1986

[54] MASSAGING APPARATUS

[76] Inventor: Wilhelm Laib, Moaurtstr. 28, 7030 Böblingen, Fed. Rep. of Germany

[21] Appl. No.: 628,775

[22] Filed: Jul. 9, 1984

[51] Int. Cl.[4] ........................ A61H 19/00; B65G 15/08

[52] U.S. Cl. ........................................ 128/52; 74/89.22; 128/79; 128/57; 198/819; 604/347

[58] Field of Search ........................ 128/32, 38, 43, 51, 128/52, 53, 57, 58, 79; 604/347, 349; 74/89.2, 89.22; 198/819

[56] References Cited

U.S. PATENT DOCUMENTS

| | | | |
|---|---|---|---|
| 2,378,795 | 6/1945 | Rube | 128/79 |
| 2,686,519 | 8/1954 | Westerman | 128/179 |
| 3,744,486 | 7/1973 | Wilson | 128/79 |
| 3,752,150 | 8/1973 | Harris | 128/79 |
| 4,174,033 | 11/1979 | Parsons | 198/819 |
| 4,312,350 | 1/1982 | Doan | 128/79 |
| 4,373,625 | 2/1983 | Parsons | 198/819 |
| 4,532,920 | 8/1985 | Finney | 128/79 A |

FOREIGN PATENT DOCUMENTS

| | | | |
|---|---|---|---|
| 835637 | 4/1952 | Fed. Rep. of Germany | 128/79 |
| 2606869 | 9/1977 | Fed. Rep. of Germany | 128/79 |

OTHER PUBLICATIONS

Jaqualator; Brochure of 10/22/68; Hydromassagic Research Corp., L.A. Calif.

*Primary Examiner*—Clyde I. Coughenour
*Attorney, Agent, or Firm*—Shlesinger, Arkwright, Garvey & Fado

[57] ABSTRACT

Massage apparatus for medicinal-therapeutical treatment of human genitals at psychical or physical irritations. A carrier tube is enclosed in a toroidal rubber hose, also filled with an antifriction mass like glycerin. Pairs of support rollers inside of the hose are journalized on the tube in encircling relationship thereof. Driving rollers, each associated to one pair of support rollers, are in engagement with the rubber hose supported by the inner support rollers for effecting revolving movement of the hose longitudinally around the tube. The drive rollers encircling the hose on the tube are rotatably supported in a common frame or housing and by their engagement with the support rollers at the same time maintain and support the carrier tube and hose.

13 Claims, 3 Drawing Figures

MASSAGING APPARATUS

BACKGROUND OF THE INVENTION

The invention concerns a massaging apparatus for the medical-therapeutic treatment of genital organs, in particular for acute nervous-muscular phenomena of debility or similar psychic and physical disorders.

The German Pat. No. 825 137 discloses a massaging apparatus in the shape of a cylindrical sleeve open at one end and placed on the male member to be treated, and which is then evacuated. The partial vacuum then generated in the cylindrical sleeve is meant to induce a blood supply in the erectile parts. The German Pat. No. 835 637 discloses a massaging apparatus to relieve nervous-muscular phenomena of debility, which is in the form of an elastic sleeve of which the aperture is constricted by an air pump in order to pump out a cavity closed on itself and enclosing the sleeve aperture.

Another massaging apparatus is known from the German Offenlegungsschrift No. 25 28 093 which consists of an elongated latex sleeve closed at one end and which while elastic does retain its shape. The sealed end of the sleeve is connected to a vibrating device generating by means of two electric motors both rotational and longitudinal vibrations transmitted by a plug-in junction integrated into the sleeve. In this known apparatus, the coupling of the vibrations from the vibrator into the sleeve takes place at a disadvantageous site and moreover the elasticity of the sleeve prevents the vibrations from being transmitted further.

OBJECTS AND SUMMPARY OF THE INVENTION

It is the object of the invention to create a massaging apparatus comprising an especially effective coupling between the massaging contact parts proper and the vibration drive which is of a sturdy design and capable of exerting an extensively natural massaging action.

This problem is solved by the invention by using a massaging apparatus including a more or less shape-retaining support tube and a soft-elastic molded body and in that the soft-elastic molded body consists of an annular rubber hose closed on itself and containing at its ends the support tube equipped with low-friction reversal zones. The hose encloses the support tube both at its inside and at its outside and performs the revolving motions about the tube in the longitudinal direction. The rubber hose contains a slippery filling substance supporting its revolving motions and which also always keeps the support tube and the rubber hose apart. The drive comprises at least two sets of drive rollers enclosing the support tube and supported on a common holding device and which act on the segment of the rubber hose covering the outside of the support tube. The drive further comprises a pair of support rollers mounted opposite each drive roller and with which it operates in concert. The pair of support rollers enclose individually supported support rollers which are located in the space between the support tube and the outer hose segment.

The invention is especially advantageous because of the drive acting in spread manner on a substantial length of the support tube and the rubber hose guided on the latter. At least four support rollers, in one embodiment, are located in that number on each side of the support tube and diametrically opposite. The support rollers are in contact with the drive rollers and form at least eight different drive points distributed across the rubber hose and which in spite of the elasticity of the hose drive this hose efficiently into revolution. It is further more advantageous that the drive this be applied on the outside of the support tube which also may be made of a somewhat elastic material because the drive forces are more effectively transmitted to the outside which has a larger periphery. Instead of being arranged diametrically opposite, the pairs of support rollers also may be mounted at arcs of 120° or 90° in which event they would be cooperating with a group of 3 or 4 drive rollers resp.

The support rollers may evince a convex profile to fit the concave shape of the drive roller contour. They may be held in floating manner in adapted transverse clearances within the support tube and they may be secured against longitudinal displacement.

It is possible to secure (or where called for exchange) the support rollers with respect to the support tube, for instance by supporting each support roller and a support roller which is approximately diametrically opposite at the support tube on a common bail-shaped spring comprising sections tightly resting against the support tube and detachably held in bent parts or other support parts of the support tube. In lieu of the so-called bent parts, it is possible also to provide integral or bonded straps enclosing the bail-shaped spring into which they detachably index.

Each bail-shaped spring may include rectilinear spindle segments to support the support rollers and to join the bail segments close to the support tube and which, as seen in the longitudinal seciton of the support tube, evince a general curvature of which the concave side faces a common plane containing the axis of the pair of drive rollers. This step results in enlarging the holding and support forces of the support rollers, taking into consideration the alternating drive direction of the drive forces delivered by the drive rollers.

The drive rollers can be provideed with longitudinal ribs or nubs to improve the engagement between the drive rollers and the rubber hose to be moved. In the case of a concave roller, contoured smooth-walled guide segments may be provided outside the area where contact is made with the support rollers, with the guide segments engaging the hose segment which is resting directly on the periphery of the support tute.

The embodiment of the massaging apparatus of the invention can also be used in the female genital area by extending the support tube while simultaneously decreasing its diameter and with the rubber hose resting on the outside of the support tube and revolving longitudinally about it and operating in the same mannger as inside, though the direction of motion is the opposite.

In one embodiment, the massaging apparatus may seat a divided and, in particular, a spherical housing, at least one end of the support tube being accessible through a housing aperture. The housing halves permit dismantling for purposes of cleaning or repair and further accept also the described individual parts and sets of components, also batteries and a reservoir for the slippery substance.

The drive for the revolving motion of the rubber hose on the support tube can be implemented in various ways. In one embodiment, sets of drive rollers are provided at two or more locations along the support tube and in the longitudinal direction at a mutual spacing from each other, enclosing the support tube in the manner of an equilateral triangle. Each drive roller presses the rubber hose against an associated pair of support rollers mounted on the periphery of the support tube. In the case of the drive force applied to the rubber hose at several places over the periphery of the support tube, the concave contour of the drive rollers and, respectively, the convex contour of the support rollers can be foregone.

The sets of drive rollers arranged in two, threes or for instance also fours, are supported jointly with a drive motor and gear means in a common support frame which in turn is held in exchangeable mannger in the housing of the apparatus and which, if called for, may also be displaceably guided in the longitudinal direction.

Further features and advantages of the invention will become clear in relation to the description below of the massaging apparatus of the invention together with the drawing showing essential details, and from the claims. The individual features can be implemented singly or in any combination in an embodiment of the invention.

DESCRIPTION OF THE INVENTION

Figure 1:
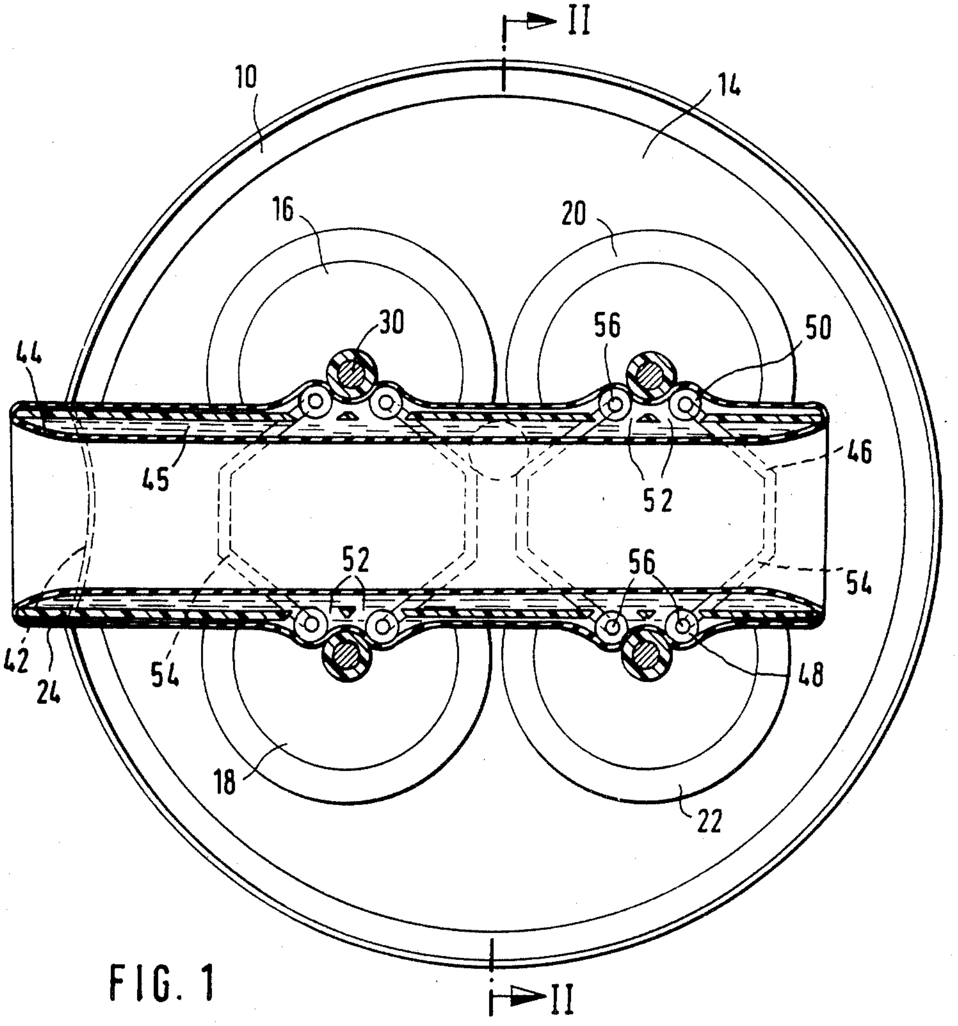
FIG. 1 is largely a schematic, axial elevation of a longitudinal section of the massaging apparatus of the invention.

Within an illustratively hemispherically split housing 10, 12, an assembly plate 14 is mounted, in preferably detachable mannger, and supports in rotatable manner two pairs of drive rollers with drive rollers 16, 18, 20, 22. The drive rollers evince a concave surface corresponding approximately to the circular or ellipsoidal cross-section of a support tube 24 further described below. The concave surface of the drive rollers consists of one surface area 26 provided with nubs or axially extending longitudinal ribs, and a smoothwalled surface area 28.

Figure 2:
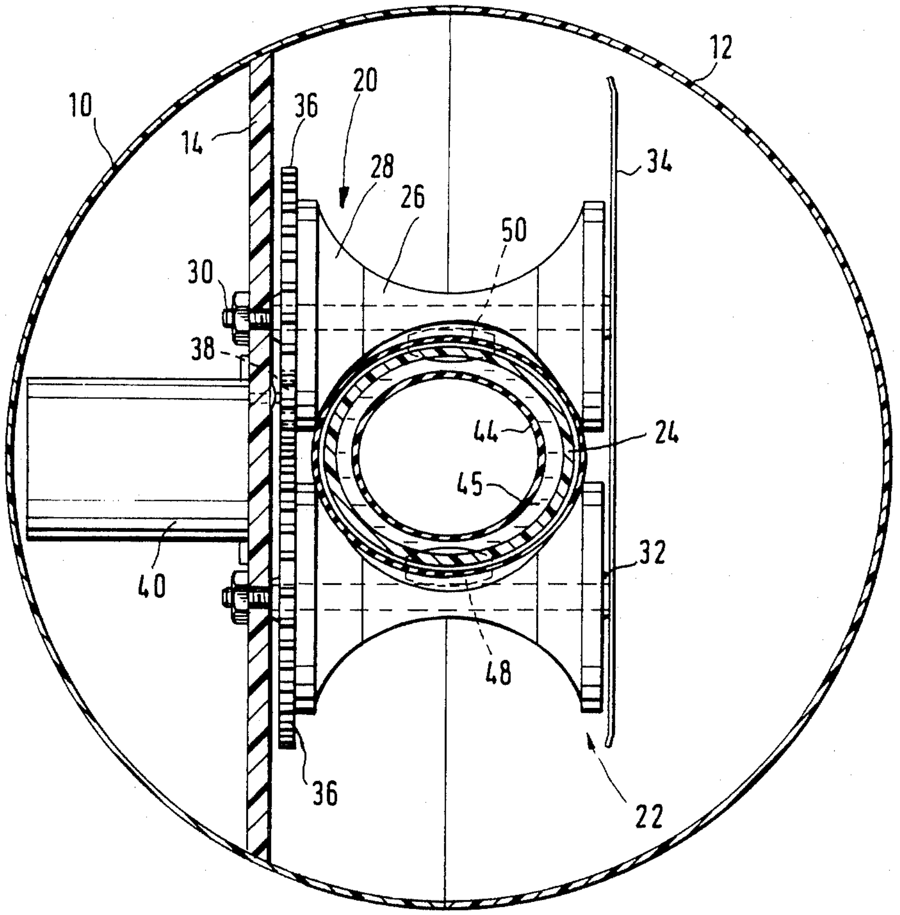
FIG. 2 is a section along line 11—11 of FIG. 1.

Spindles 30 fixed in the assembly wall may be provided to support the drive rollers of FIG. 2, said spindles projecting in cantilever manner and each supporting a drive roller. The drive rollers 16–22 at the opposite end can be provided each with a central projection 32 by means of which they are received in a recess, omitted from FIG. 2, of a matching holding base 34 fastened to the second housing half 12. The drive rollers each are provided at their faces pointing to the assembly wall 14 with a peripherally toothed disk or a spur gear 36, so that the drive rollers 16 and 20 are engaged for drive operation with the drive pinion 38 of an electric motor 40 which can be reversed at a controlled rate. Simultaneously, the spur gears 36 of the mutually opposite rollers 16, 18, 20, 22 are mutually engaged also.

A support tube 24, shown in FIG. 1, passes through the space enclosed in each case by the pairs of drive rollers 16, 18 and 20, 22 and projects on at least one side of the spherical housing 10, 12 from an aperture 42. The length of the support tube may be larger in relation to the housing than shown in FIG. 1. The support tube 24 may consist of a shaperetaining plastic evidencing some elastic deformability, in order to assume for instance the ellipsoidal shape shown in FIG. 2. The support tube is enclosed on its inside and its outside by a single annular rubber hose 44 closing on itself. For the sake of visualization, this hose can be compared to an automobile inner tube with an annular space closing on itself. The support tube 24 is located within that annular space and also contains a filler substance with slippery properties, for instance glycerin, in order to maintain a space between the support tube and the rubber hose. The support tube is appropriately provided with smooth-wall reversing zones or smaller reversing rollers at its ends, whereby no difficulties are encountered in practice to move the rubber hose 44 of FIG. 1 to and fro in the longitudinal direction. The hose segment within the support tube obviously moving oppositely to the hose segment outside. A revolving motion around the support tube takes place in this manner. Detachably held pairs of support rollers 48. 50 rest by means of bail-shaped springs 46 on the support tube 24 and within the rubber hose 44. The support rollers evince a convex contour, rs shown in FIG. 2, in order to fit the concavity of the drive rollers 16–22. Preferably, they are held in floating manner in clearances 52 in the support tube and transverse to it and are secured against longitudinal displacement.

As shown in FIG. 1, a particular lower support roller 48 and a particular upper support roller 50 are generally diametrically opposite each other across the support tube 24 and rest on a common bail-shaped spring 46. The bail-shaped spring includes rectinlinear upper and lower spindle segments 56 on which rest the support rollers. The spindle segments 56 are joined by curved segments 54 and rest tightly against the support tube 24. As shown in FIG. 1, bails are created of which the concave side faces a plane common to both spindles 30 of the associated pair of drive rollers 20, 22.

The curved bail segments 54 are maintained in snapin positions in bent parts, or attachments, of the support tube which are omitted from the Figure. In one embodiment, the shown bail-shaped springs 46 can flare as far as the bail halves on the side of the suppport tube which the support rollers 48, 50, are mounted within the rubber hose 44. The support rollers 48, 50 are held in floating manner within the clearances 52 and are enclosed by the viscous slippery material, for instance glycerin, which is located within the rubber hose. This does not degrade the transmission of force because the drive rollers 16–22 act on the outside walls of the rubber hose and because the elastically resting support rollers within the rubber hose need only deliver the bearing force. The manner of drive chosen with the drive rollers always positioned between two support rollers assures reliable, positive engagement which may be enhanced by roughening the surface of the drive rollers.

Figure 3:
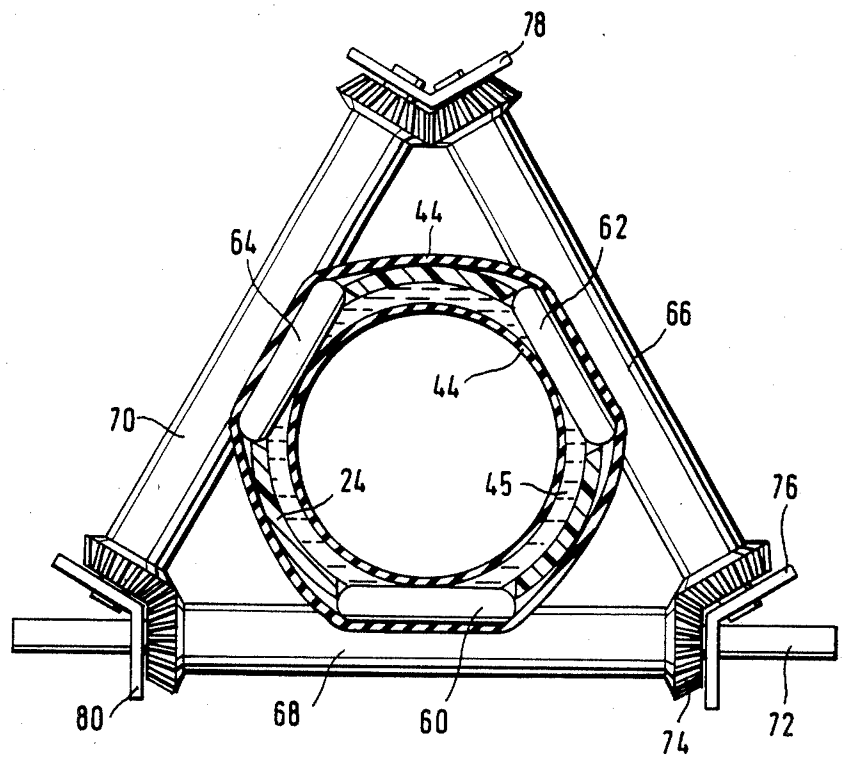
FIG. 3 is a section similar to that of FIG. 2 of the support tube and the hose drive for another embodiment.

The schematic of FIG. 3 illustrates another embodiment of the massaging apparatus and is similar to FIG. 1. Pairs of support rollers 60, 62, 64 rest on the support tube 24 within the rubber hose 44, FIG. 3 showing only one support roller of each pair. The support rollers rest, for instance, by means of intergrated bearing pins in raised attachments or bent-up parts of the support tube, and similarly to the case for FIGS. 1 and 2, they each extend through clearances in the periphery of the support tube in the direction of the chord.

A drive rollers 66, 68, 70 is associated with each pair of support rollers 60, 62, 64 and drives the rubber hose 44 which is uniformly resting across the periphery of the support tube 24 at three equally distributed locations. Bevel gears 74 are mounted on the drive roller spindles 72 on both sides of the drive rollers so that these drive rollers are pairwise mounted at an angle of 60° to each other and all rotate in the same direction by means of the mitually engaging bevel gears 74 of the support tube.

The spindle pins of neighborig drive rollers rest immediately in the vicinity of the mutually meshing bevel gears 74 in the longitudinal rame parts 76, 78, 80 which are joined together by bracing means outside the plane of the drawing into a strengthened support frame.

Driving gears may be mounted on both ends of the drive roller spindle 72 and can be driven by the drive pinions of a motor mounted underneath the horizontal shaft. In one embodiment, two identical sets of drive rollers, as shown in FIG. 3, can be mounted along the support tube in sequence and spaced apart, in which case the motor with its drive pinions is mounted between the two lower drive roller spindles 72.

The longitudinal frame parts 76, 78, 80 of the strengthened but omitted support frame, which can extend across a substantial length of the support tube 24, are designed in an embodiment which is not shown as guide means for guide rollers elastically mounted in an enclosing apparatus housing, where said guide rollers each point toward the center axis of the support tube. The longitudinally guided support frame is guided within this apparatus housing by means of terminal damping members, for instance springs, within the scope of a specific longitudinal excursion. Adjustable reversing switches located within the apparatus housing can be connected to a switch lever mounted to the support frame and connected to the motor in order to reverse the direction of rotation of the rubber hose in the end positions of the support frame which is guided in the housing without its own drive and which can be moved to and fro, where no other motor control is used.

This type of longitudinal displacement for a support frame of course can also be applied to the embodiment of FIGS. 1, 2 provided the assembly plate 14 and a matching plate 34 held rigidly in relation to it in the apparatus housing are displaceable as a frame unit in appropriate longitudinal guide means.

The massaging apparatus is also used in the female genital area, and for that purpose the support tube including the rubber hose is extended on the left side in FIG. 1 or also with an additional housing aperture on the right side, the diameter of the support tube 24 being reduced. The hose segments rest on the outside of the support tube and by being moved to and fro in the longitudinal direction are effective in this respect.

Obviously the massaging apparatus can be improved by such variations or additions as are within the basic concept of the invention. In that respect, for instance, steps can be taken to conveniently open and close the apparatus housing for purposes of cleaning and repairs, and also to be able to take apart the drive rollers of the associated pairs or sets, so that the support tube rogether with the enclosing rubber hose can be maintained as a unit.

What I claim is:

1. A massaging apparatus for the medical-therapeutic treatment of the human genital organs to remedy psychic and physical disorders, comprising a substantially shape-retaining support tube inside of which is mounted soft-elastic molded body which is driven by a drive means to perform a to-and fro motion in the longitudinal direction with respect to the support tube, characterized in that the soft-elastic molded body consists of an annular rubber hose (44) closed on itself and containing the support tube (24) which is provided at its ends with low friction reversing zones, said rubber hose (44) enclosing said support tube (24) both on the inside and the outside and revolving longitudinally about it, in that the rubber hose (44) contains a slippery substance (45) sustaining its revolving motions and also always maintaining a spacing between the support tube (24) and the rubber hose, and in that the drive means includes at least two sets of drive rollers enclosing the support tube, resting on a common holding means, and acting on the rubber hose segment covering the outside of the support tube (24) as well as a pair of support rollers (48, 50) mounted opposite each associated drive roller and cooperating with it, said pair of support rollers enclosing individually supported support rolls in the space between the support tube and the outer hose segment.

2. Massaging apparatus per claim 1, characterized in that the support rollers (48, 50) evince a convex surface fitted to the concavity of the drive rollers (16–22) and are held in floating mannger in corresponding transverse clearance (52) within the support tube (24) and are secured against longitudinal displacement.

3. Massaging apparatus per claim 1, characterized in that each support roller (48) and an opposite support roller (50) generally located diametrically opposite with respect to the support tube (24) rest on a common bail-shaped spring (46) which includes detachable segments (54) fixed in attachments or bent parts of the support tube (24) and also segments resting tightly against said tube.

4. Massaging apparatus per claim 3, characterized in that each bail-shaped spring (46) includes rectilinear spindle segments (56) to hold the support rollers (48, 50) which are joined by the segments tightly resting against the support tube and which as seen in the longitudinal section of the support tube evince a bail-shaped curvature of which the concave side faces a plane common to both axes of the pair of drive rollers.

5. Massaging apparatus per claim 1, characterized in that the drive rollers (16–22) are provided at one end face with a peripheral toothing or a spur gear (36) so that together with the associated opposite drive roller or the drive pinion (38) they are operationally engaged with an electric motor (40) which can be reversed at an adjustable rate.

6. Massaging apparatus per claim 1, characterized in that the drive rollers (16–22) rest on one side in bearing seats in a holding wall (14) while on the other side they are fastened by means of a spindle-forming projection (32) in a recess of an apparatus-base (34) rigidly connected to the holding wall.

7. Massaging apparatus per claim 1, characterized in that the support tube (24) comprises an extended segment at one end which is away from the drive and on the outside of which the longitudinally moving rubber hose (44) exerts the same action as inside except in the opposite direction of motion.

8. Massaging apparatus per claim 1, characterized in that support rollers (60, 62, 64) rest in at least three evenly distributed sites across the peripherv of the support tube (24) in pairwise manner and in integrated attachments, each being associared to a parallel drive roller and resting against the outside of the rubber hose, that the drive rollers (66, 68, 70) are drive-coupled to each other by means of bevel gears (74) and rest in and are braced by a support frame enclosing the support tube at least in the region of the drive rollers, said support frame in turn being received within an apparatus housing that is provided at least on one side with an aperture as a passageway for the support tube with the rubber hose (44) movable thereon.

9. Massaging apparatus per claim 8, characterized in that at least two sets of drive rollers enclosing the rubber hose (44) on the support tube (24) are joined together along the support frame, sets of pairs of support rollers resting on the periphery of the support tube being associated with said sets of drive rollers.

10. Massaging apparatus per claim 9, characterized in that the sets of drive rollers are driven by an electrical motor which can be reversed in its direction of rotation and is located within the apparatus housing, said motor being mounted on the support frame and engaging by at least one drive pinion each gear of the two sets of drive rollers, said gear being seated on an end segment of a drive roller shaft.

11. Massaging apparatus per claim 10, characterized in that the support frame joining the sets of drive rollers to each other is provided with rails which are parallel to the support tube and which are guided on rollers resting in the apparatus housing, and in that the longitudinal displacement of the guided support frame is spring-absorbed on both sides by means of elastic damping members in the housing.

12. Massaging apparatus per claim 11, characterized in that adjustable reversing switches are provided in the apparatus housing in the area of the displacement ends, which are associated with a contact-spring connected to the electric motor and reversing the direction of motion of the rubber hose (44) in the area of the displacement ends of the support frame.

13. Massaging apparatus per claim 1, characterized in that the support tube is provided with a ring of reversing rollers or with low-friction surfaces and possibly slightly reinforced end segments at its ends for the purpose of easier reversal of the rubber hose in its revolving motion.

* * * * *